(12) United States Patent
Sundaram

(10) Patent No.: US 10,501,857 B2
(45) Date of Patent: Dec. 10, 2019

(54) ADDITIVE MANUFACTURING BY LOCALIZED ELECTROCHEMICAL DEPOSITION

(71) Applicant: University Of Cincinnati, Cincinnati, OH (US)

(72) Inventor: Murali Sundaram, Montgomery, OH (US)

(73) Assignee: University of Cincinnati, Cincinnati, OH (US)

(*) Notice: Subject to any disclaimer, the term of this patent is extended or adjusted under 35 U.S.C. 154(b) by 0 days.

(21) Appl. No.: 15/235,460

(22) Filed: Aug. 12, 2016

(65) Prior Publication Data

US 2017/0044680 A1    Feb. 16, 2017

Related U.S. Application Data

(60) Provisional application No. 62/205,229, filed on Aug. 14, 2015.

(51) Int. Cl.
| | | |
|---|---|---|
| *C25D 21/12* | (2006.01) | |
| *C25D 1/00* | (2006.01) | |
| *C25D 3/12* | (2006.01) | |
| *B33Y 10/00* | (2015.01) | |
| *B33Y 30/00* | (2015.01) | |
| *B33Y 70/00* | (2015.01) | |
| *C25D 3/38* | (2006.01) | |
| *C25D 3/46* | (2006.01) | |

(52) U.S. Cl.
CPC .............. *C25D 1/003* (2013.01); *B33Y 10/00* (2014.12); *B33Y 30/00* (2014.12); *B33Y 70/00* (2014.12); *C25D 3/12* (2013.01); *C25D 3/38* (2013.01); *C25D 3/46* (2013.01); *C25D 21/12* (2013.01)

(58) Field of Classification Search
None
See application file for complete search history.

(56) References Cited

U.S. PATENT DOCUMENTS

| | | | | |
|---|---|---|---|---|
| 3,762,882 A | * | 10/1973 | Grutza ................... | C25D 15/02 205/109 |
| 4,581,301 A | * | 4/1986 | Michaelson ........... | H05K 3/188 205/125 |
| 5,512,162 A | * | 4/1996 | Sachs ...................... | B22F 3/008 156/272.8 |

(Continued)

FOREIGN PATENT DOCUMENTS

CN          104593830       * 11/2013  ............... C25D 1/00

OTHER PUBLICATIONS

English translation of CN104593830 (Year: 2013).*

(Continued)

*Primary Examiner* — Stefanie S Wittenberg
(74) *Attorney, Agent, or Firm* — Wood Herron & Evans LLP

(57) ABSTRACT

A method of electrolytic additive manufacturing provides 3-D parts. The method can be used to form parts from particulate material in an electrolytic bath. Metal is electrolytically deposited, binding the particles. Layers of the particles are built up to form the parts. The same process can be used to form parts without the particulate material. Layers of metal are electrolytically deposited in the electrolyte bath to form the parts.

10 Claims, 4 Drawing Sheets

(56) References Cited

U.S. PATENT DOCUMENTS

| | | | | |
|---|---|---|---|---|
| 5,641,391 | A * | 6/1997 | Hunter | C25D 5/02 205/133 |
| 6,363,606 | B1 * | 4/2002 | Johnson, Jr. | B22F 3/008 29/854 |
| 7,517,462 | B2 * | 4/2009 | Cohen | B81C 1/00492 216/2 |
| 2005/0023145 | A1 * | 2/2005 | Cohen | C25D 1/00 205/118 |
| 2007/0089993 | A1 * | 4/2007 | Schwartz | C25D 5/02 205/133 |
| 2010/0300886 | A1 * | 12/2010 | Lin | C25D 17/00 205/81 |
| 2011/0203937 | A1 * | 8/2011 | Sidhu | C25D 5/02 205/133 |

OTHER PUBLICATIONS

Sachs, E., et al., "Three-Dimensional Printing: Rapid Tooling and Prototypes Directly from a CAD Model", Annals of the CIRP, vol. 39/1/1990 (Year: 1990).*

Madden et al. "Three-dimensional microfabrication by localized electrochemical deposition", Journal of microelectromechanical systems, 5, Mar. 1, 1996 (Year: 1996).*

Anderson et al. "On electrochemical deposition for layered manufacturing", Proceedings of DETC'04, Computers and Information in Engineering Conference, 2004 (Year: 2004).*

Wong et al. "A review of additive manufacturing", ISRN Mechanical Engineering, 208760, 2012 (Year: 2012).*

\* cited by examiner

ADDITIVE MANUFACTURING BY LOCALIZED ELECTROCHEMICAL DEPOSITION

RELATED APPLICATIONS

This application is based on provisional patent application U.S. Ser. No. 62/205,229, filed on Aug. 14, 2015, the disclosure of which is hereby incorporated by reference in its entirety as if fully set forth herein.

TECHNICAL FIELD

The present invention relates generally to additive manufacturing and, more specifically, to additive manufacturing by localized electrochemical deposition.

BACKGROUND

Porous structures are increasingly preferred in energy, biomedical, aerospace, chemical and other industries for various applications such as filtration and separation, distribution and control of fluid, electromagnetic shielding, heat exchanger, energy absorption, electrode matrices, and reaction matrices, due to their outstanding properties such as low specific weight, controlled permeability, large specific surface area, high energy absorption, and good absorption of electromagnetic waves. Specific examples of micro size porous parts include applications, such as wearable electronics and micro fuel cells.

Existing powder metallurgy and additive manufacturing (AM) based processes, such as micro metal injection molding and laser micro sintering, are capable of producing porous metal micro parts. However, these existing processes have several inherent drawbacks, such as the need for complex micro molds and the difficulty of filling feedstock completely into narrow cavities in micro injection molding. Further, laser and other thermal processes often have inevitable thermal effects such as thermal residual stress, cracking, and burr formation. More particularly, some AM processes such as Selective Laser Melting (SLM) and Electron Beam Melting (EBM) suffer from very high residual stresses due to the complete melting of the material during manufacturing. For example, the residual stresses caused by the thermal gradient associated with sintering processes are very high (>200 MPa). Another major roadblock that limits the application of the AM parts is that the part generally tends to have anisotropic properties due to the layered nature of the manufacturing.

Other complexities associated with traditional AM processes include the need for complex machining systems such as vacuum chambers, as in the case of Selective Micro Laser Sintering, to avoid humidity and resulting oxidation. One of the problems of inkjet process is that the viscous dissipation of binder fluid results in orifice clogging, which impedes ejection of the binder fluid through the nozzle. Also, the jetting process must be performed in a low oxygen environment to prevent the formation of a surface oxide layer, thus, resulting in changes to the physical properties of the jet surface. In summary, existing additive manufacturing techniques have several limitations ranging from a restricted choice of work material, to anisotropy, strength, scalability, internal stresses, and poor layer binding, resolution, and surface finish. Therefore, there is a clear need for alternate manufacturing approaches to produce porous micro parts without aforementioned constraints.

SUMMARY

Embodiments of the present invention are directed to methods of micro-fabricating metallic components layer by layer or voxel by voxel using localized electrochemical reactions. More specifically, embodiments of the present invention include electrochemically depositing metal binder to bind particles at specified locations. In other words, metallic micro-components are formed atom-by-atom, or layer-by-layer (i.e., additive manufacturing), via localized electrochemical deposition. An aspect of the present invention is that such additive manufacturing allows for the fabrication of powder and powder-less metal parts by additive manufacturing without thermal damage, as further described below.

The electrochemical deposition process is capable of depositing most conductive material including metals, metal alloys, conducting polymers and even some semiconductors. The properties of the deposited materials can be modified according to the experimental conditions leading to the manufacturing of functional parts with varying properties. The residual stresses associated with the pulsed electrochemical deposition/electroforming processes are negligible compared to the sintering/melting processes. Electrochemical deposition techniques offer the technical and economic advantages characteristic to the electroplating technology, combined with being a mask less procedure achieving shorter development times.

The objects and advantages of present will be appreciated in light of the following detailed descriptions and drawings in which:

DETAILED DESCRIPTION

Figure 1:
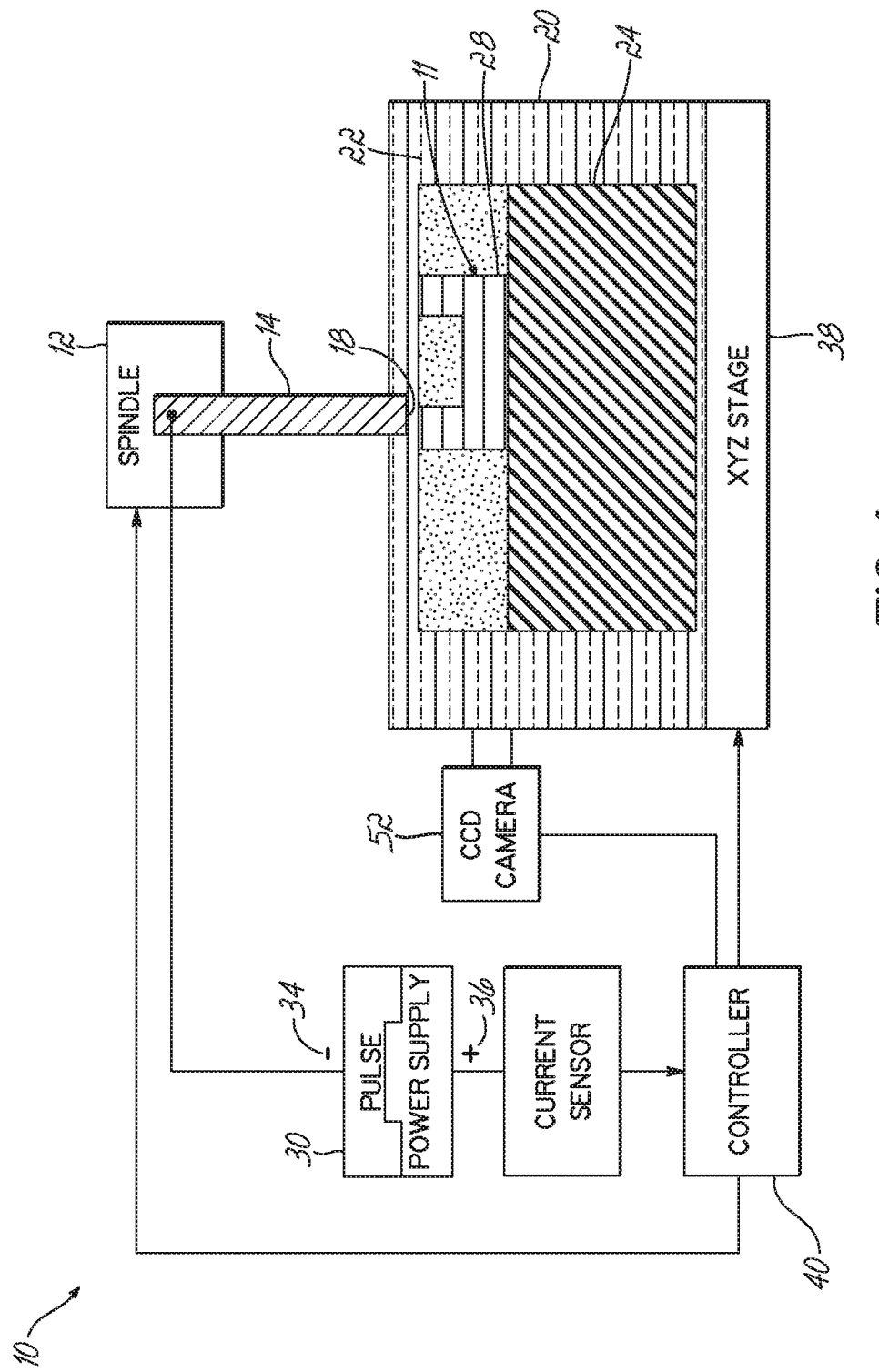
FIG. 1 is a schematic diagram of a system for producing a component by electrochemical deposition according to an embodiment of the present invention.
Figure 2:
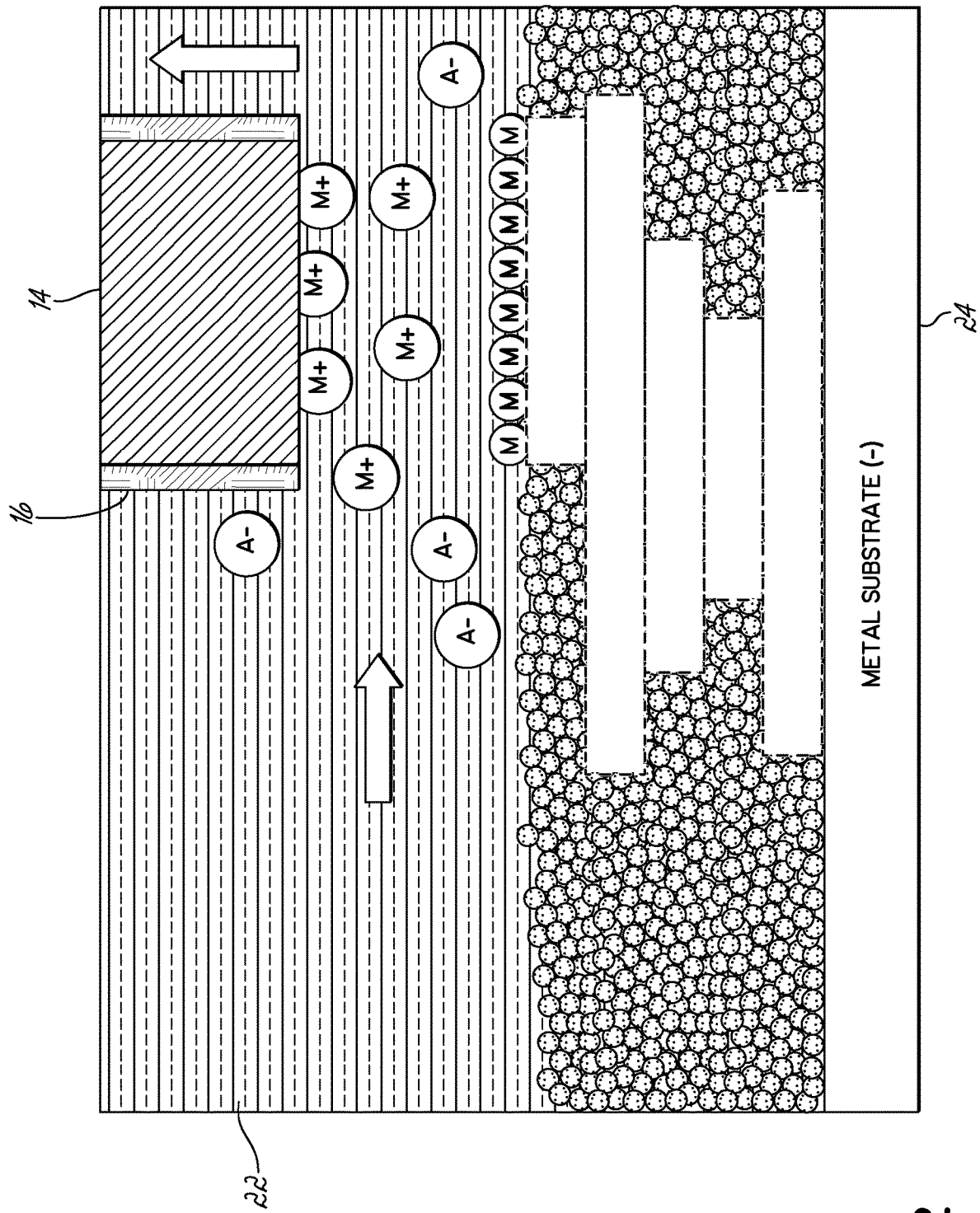
FIG. 2 is a schematic diagram of the system of FIG. 1 showing the electrochemical deposition in more detail.

With reference to FIGS. 1 and 2, in one embodiment, a system 10 for producing a component 11 by electrochemical deposition includes a spindle 12 coupled to a tool electrode 14. The tool electrode 14 may be, for example, a platinum micro-electrode coated with insulating material 16 on the sides with an exposed disc-like end 18. The system 10 further includes an electrochemical tank 20 containing an electroplating solution 22 and a substrate 24. The substrate 24 may be, for example, a highly polished metal plate. A first layer 26 of a particulate material such as metal particles or an inert material such as diamond particles is deposited on the substrate 24 (shown in FIG. 3A). Exemplary particulate material is shown in Table 1.

TABLE 1

| Material | Particle Size |
|---|---|
| Copper | 500 mesh (<25 μm), 400 mesh (<37 μm), 325 mesh (<44 μm) |
| Diamond | <4 μm |

The concentration of the particulate material is generally _500_g/l to _1250_g/l. The electroplating solution 22 includes a metal binder to be deposited on the substrate 24 The deposited metal binder interacts with the particulate material in the first layer 26 to bind the particles to create a first layer 28 of the component 11 on the substrate 24. In an embodiment, the electroplating solution 22 is a Watts bath and contains nickel sulfate (240 g/L distilled water), nickel chloride (45 g/L distilled water) and boric acid (30 g/L distilled water). Exemplary electrolyte solutions are shown in Table 2. Basically, any electrolyte which deposits a metal can be used.

TABLE 2

| Deposited Species | Electrolyte | Concentration Ranges |
|---|---|---|
| Nickel | Nickel Sulfate, Nickel Chloride, Boric Acid Nickel Sulfamate | 700 m-5000 mol/m$^3$ |
| Copper | Copper Sulfate | |
| Silver | Silver Chloride | |

Still referring to FIG. 1, the system 10 further includes a power supply 30 configured to apply an electric field between the tool electrode 14 and the substrate 24. The power supply 30 may be a pulsed power supply, which is believed to have a higher current density and to intensify the asymmetrical distribution of current to produce a fine grained, smoother finished structure. In an embodiment, the tool electrode 14 acts as a micro-anode and is coupled to a negative terminal 34 of the power supply 30, and the substrate 24 acts as the cathode and is coupled to a positive terminal 36 of the power supply 30. Because the exposed part of the tool electrode 14 has a very small surface area, the electric field is highly confined and, hence, localized electrodeposition is possible. The tool shape and size determines exposed surface area. For a cylindrical tool, the length of the exposed cylinder may be 0-20 μm and the diameter, for example, may be 50-250 μm. The tool can be a rectangular plate, a ring or a disk, depending on the desired application. Thus, the localized electric field allows for the metal binder present in the electroplating solution 22 to be deposited at specific locations on first layer 26. Consequently, where the metal binder is deposited, the metal binder binds the particles in the first layer 26.

With further reference to FIGS. 1 and 2, the inter-electrode gap between the anode (e.g., the tool electrode 14) and the cathode (e.g., the substrate 24) should be maintained to avoid short-circuiting the system 10 during electrodeposition. In that regard, the system 10 includes a three-axis stage 38, which carries the substrate 24 and may be used to adjust the position of the substrate 24. Clamping features may be used to hold the substrate 24 in place on the stage 38 (not shown). A controller 40 is configured to control the movement of the stage 38 along the three axes via stepper motors 42 and low-current stepper motor controllers 44. In an embodiment, the stepper motors 42 may be NEMA 08 stepper motors. The low-current stepper motor controllers 44 may be connected to a parallel port breakout board 46, which in turn is connected to the controller 40. The stage 38 may be able to move along each of the axes by a distance ranging from 1 micron to 10 mm. The rate of movement (i.e., the feed rate) may be user defined and can range from about 32 mm/min to about 1 micron/sec. The controller 40 may further be configured to control the spindle 12. More specifically, spindle 12 may be rotatable, and the controller 40 may be configured to control the rotation of the spindle 12 and, consequently, the tool electrode 14. The rotation enhances electrolyte circulation and disperses oxygen bubbles, which can interfere with the process.

Still referring to FIG. 1, the controller 40 includes a closed loop feed-back system that uses a current sensor 48, a position sensor 50, and a CCD camera 52. The current sensor 48 measures the current between the tool electrode 14 and the substrate 24, and the position sensor 50 senses the position of the stage 38. The CCD camera 52 monitors the process. The images are used to give tool-substrate position, deposition progress, bubbling behavior, and collision prevention on a coarse level. As the inter-electrode distance between the tool electrode 14 and the substrate 24 decreases, the current increases. When the current reaches a pre-set threshold value, the controller 40 causes the stage 38 and, consequently, the substrate 24 to move away from the tool electrode 14, thus increasing the inter-electrode gap. The controller 40 may be configured to move the stage 38 until the detected current reaches a pre-determined value, which corresponds to a pre-determined inter-electrode gap. This ensures that there is a constant gap between the anode and the cathode during electrodeposition.

Figure 3A:
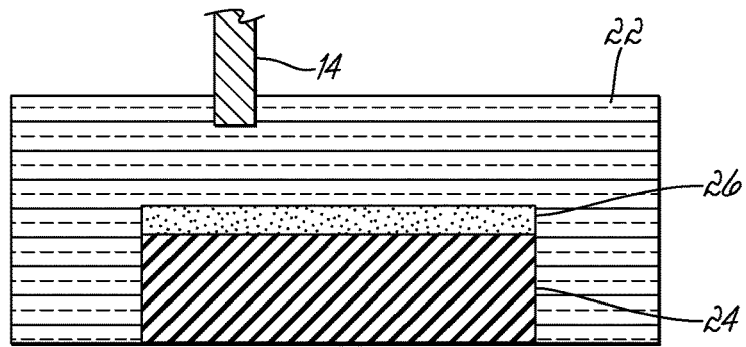
FIGS. 3A-3C are schematic diagrams showing a component being produced by electrochemical deposition using a method according to an embodiment of the present invention.
Figure 3B:
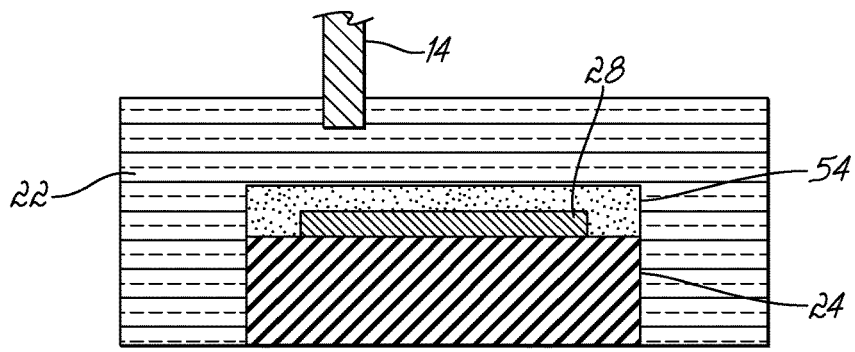
Figure 3C:
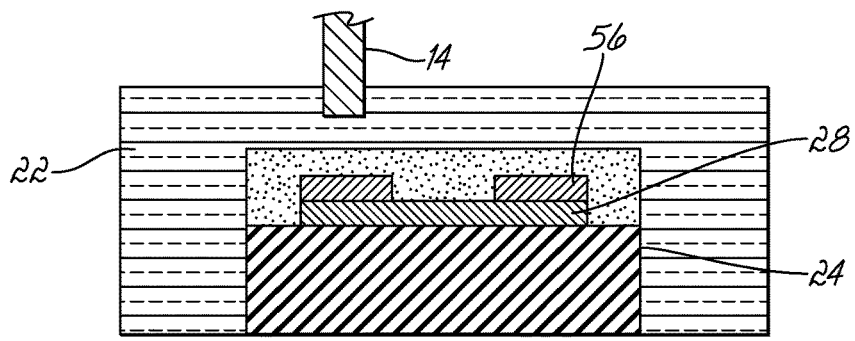
Figure 3D:
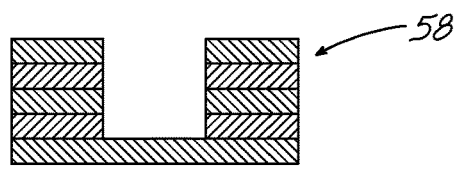
FIG. 3D is a cross-sectional view of a component produced according to the method shown in FIGS. 3A-3C.

With reference to FIGS. 1 and 3A-3D, a method according to an embodiment is shown. The electrolyte includes a suspension of particles in the electrolyte solution. First, the first layer 26 of particles is deposited on the substrate 24 as shown in FIG. 3A. The tool electrode 14 is placed in the electroplating solution 22 with the disc-like end 18 near the substrate 24 on which electrodeposition is to occur. The power supply 30 applies the electric field between the tool electrode 14 and the substrate 24. The localized electric field causes the metal ions present in the electroplating solution 22 (e.g., nickel in a Watts bath) to be deposited on the substrate 24. Thus, the deposited metal binder binds the particles in the first layer 26 creating the first component layer 28 of metal, as shown in FIG. 2. The controller 40 controls the movement (e.g., the rotation) of the spindle 12 during electrodeposition. Due to the first component layer 28 of metal, the inter-electrode distance between the tool electrode 14 and the substrate 24 decreases causing the current therebetween to increase. The current sensor 48 senses the increased current, and the controller 40 moves the stage 38 via the stepper motors 42 until the current reaches the pre-determined value (alternately, the tool can be moved relative to the stage). Now, the pre-determined inter-electrode gap exists between the tool electrode 14 and the substrate 24, and a second layer 54 of particles may be deposited on the substrate 24. As shown in FIGS. 3B and 3C, the electrodeposition steps may be repeated, thus locally depositing metal binder and forming a second layer 56 of bonded particles. Accordingly, as the controller 40 moves the stage 38 and the electrodeposition steps are repeated, the layer-by-layer interaction between the particles and the metal binder result in layers of the particulate material (such as copper or diamond) formed on the substrate 24 by which the desired micro-component 58 is fabricated, as shown in FIG. 3D.

In an embodiment, the controller 40 uses computer numeric control ("CNC") software such as Mach3. Further, the power supply 30 is controlled by a program, such as LabVIEW, which in turn interacts with Mach3 to move the stage 38 along an axis as desired. A 3D CAD model of the desired micro-component may be loaded onto software, such as SKIENFORGE, which converts 3D models by slicing them into G codes that provide a path for the tool electrode 14 required for the layer-by-layer manufacturing. The G-codes generated through this software are then loaded into Mach3 program, which then sends out step/direction pulses based on the G-codes to control the movement of the stage 38.

Figure 4:
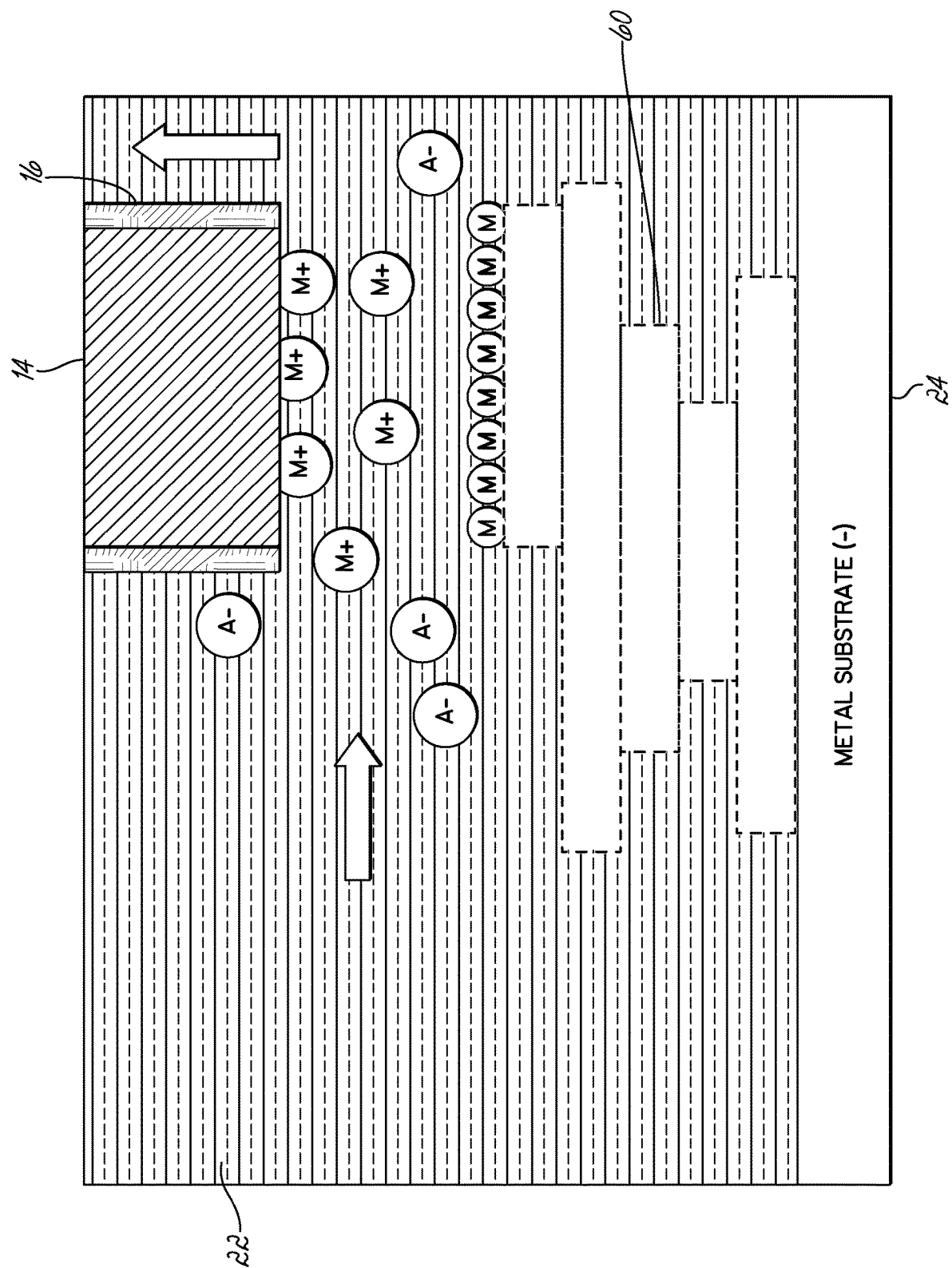
FIG. 4 is a schematic diagram of electrochemical deposition according to another embodiment of the present invention.

With reference to FIG. 4, a component 60 may be produced by powder-less electrochemical deposition. In an embodiment where the tool 14 is formed from a generally inert material such as platinum, nickel or titanium, metal ions (M+) in the electroplating solution 22 may deposit as a solid layer in predetermined locations by the localized deposition. This is repeated layer by layer until the desired part is formed. In another embodiment where the tool 14 has a reduction potential less than the hydrolysis potential, metal ions (M+) originating from the tool 14 (i.e., the anode) are locally deposited as a solid in predetermined locations on the substrate 24.

Either the powder method or the powderless method can be used to form articles with varying porosity. By controlling parameters including voltage, pulse period, electrolyte concentration tool electrode speed, electrolyte circulation, as well as electrolyte additives, one can control porosity. For example, high voltage increases porosity by depleting ions and bubble formation. Lower electrolyte concentrations increase porosity.

Thus, the present invention can be used to produce a wide variety of different porous articles, including multilayered aerospace components, biomedical component filters and the like. Due to the method of manufacture, thermal stresses are avoided.

While specific embodiments have been described in considerable detail to illustrate the present invention, the description is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method of forming a 3-D structure, comprising:
   depositing a voxel or layer of metal in an electrolyte bath on a substrate by:
   depositing a powder to form a layer of particulate material that covers said substrate,
   moving said substrate relative to an electrode according to an electrode path based on a model of the 3-D structure, and
   applying a localized electric field between said electrode and said substrate as said substrate is moved to selectively electrolytically deposit a metal binder present in said electrolyte bath on said layer of particulate material, said metal binder selectively binding said particulate material only where said metal binder is deposited to form said voxel or layer of metal; and
   separating said electrode from said voxel or layer of metal and repeating said steps of depositing said powder to form another layer of particulate material that covers one or more previously formed voxels or layer of metal, moving said substrate, and applying said localized electric field multiple times to deposit multiple metal voxels or layers of metal binding said particulate material, thereby forming the 3-D structure without the use of a mask.

2. The method claimed in claim 1 wherein said powder comprises metal particles.

3. The method claimed in claim 1 wherein said electrode is separated from said voxel or layer of metal in response to a detected measurement of an electrical property.

4. The method claimed in claim 3 wherein said electrical property is current.

5. The method claimed in claim 1 wherein said electrolyte bath includes a metal ion selected from a group consisting of nickel, copper, and silver ions, and combinations thereof.

6. The method claimed in claim 1 wherein movement of said electrode relative to said substrate is at least partially controlled in response to input from a camera.

7. The method claimed in claim 1 wherein said electrode is a metal electrode partially coated with an insulating material.

8. The method claimed in claim 3 wherein a constant gap is maintained between an uppermost voxel or layer of metal and a tip of said electrode.

9. The method claimed in claim 1 further comprising creating the electrode path by dividing said model of the 3-D structure into a series of voxels or layers.

10. The method claimed in claim 1 wherein a portion of one of said multiple metal voxels or layers that is overhanging a metal voxel or layer below it is not supported by a solid substrate beneath the voxel or layer of metal being deposited while said step of applying the localized electric field between said electrode and said substrate is being repeated.

* * * * *

UNITED STATES PATENT AND TRADEMARK OFFICE
CERTIFICATE OF CORRECTION

| | |
|---|---|
| PATENT NO. | : 10,501,857 B2 |
| APPLICATION NO. | : 15/235460 |
| DATED | : December 10, 2019 |
| INVENTOR(S) | : Murali Sundaram |

It is certified that error appears in the above-identified patent and that said Letters Patent is hereby corrected as shown below:

In the Claims

Column 6, Line 17, Claim 1, change "one or more previously formed voxels or layer of metal" to --one or more previously formed voxels or layers of metal--.

Signed and Sealed this
Fifth Day of May, 2020

Andrei Iancu
*Director of the United States Patent and Trademark Office*